United States Patent Office 2,790,560
Patented Apr. 30, 1957

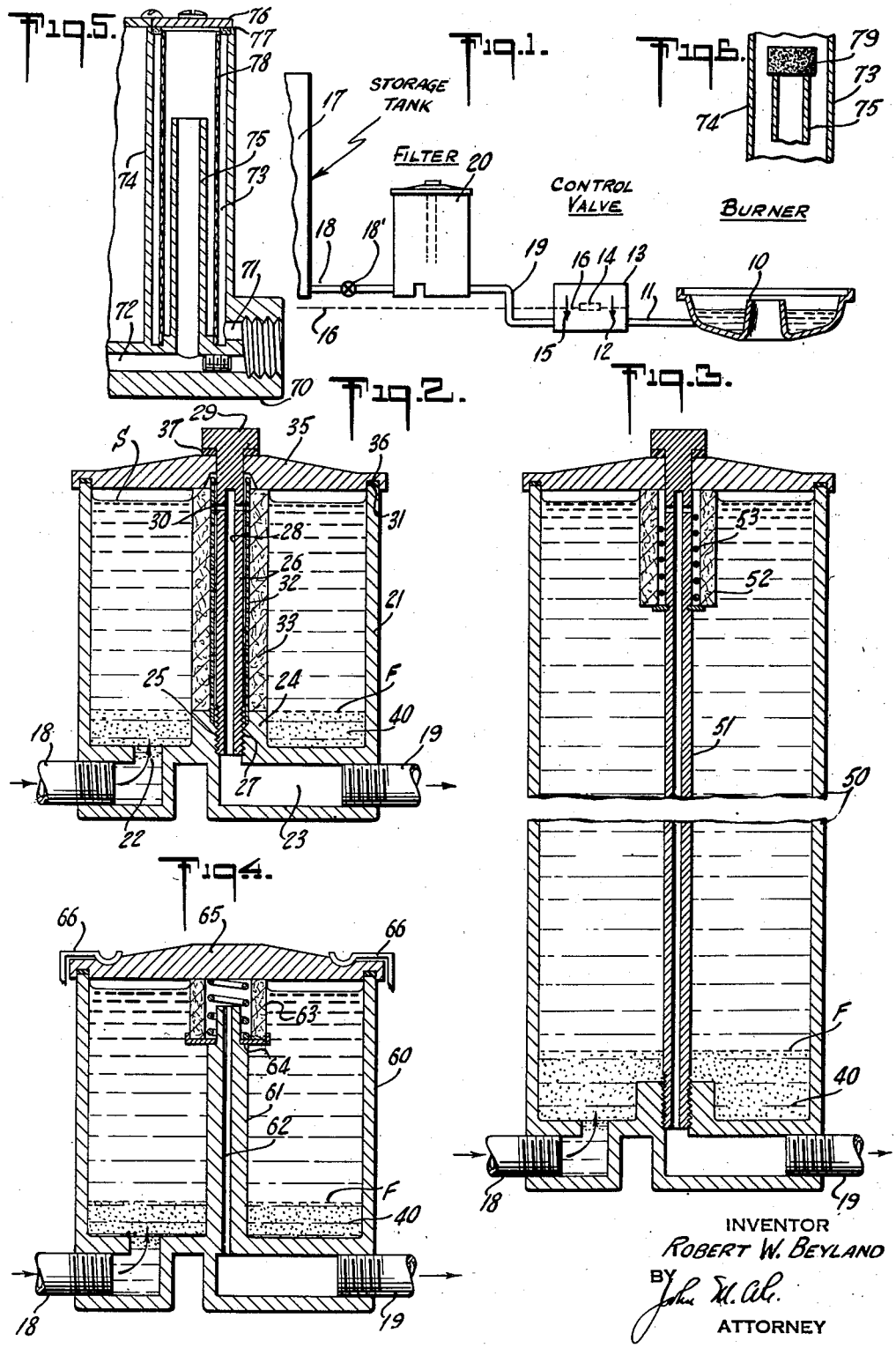

2,790,560

LIQUID SEPARATOR

Robert W. Beyland, Yalesville, Conn.

Application November 27, 1951, Serial No. 258,428

1 Claim. (Cl. 210—296)

The present invention relates to liquid filtration.

Where commercial petroleum products such as the higher grades of fuel oil are used it is highly desirable to provide the consuming burner and associated equipment with fuel oil as free as possible from water, dirt, mechanically entrained foreign particles and immiscible petroleum constituents, some or all of which are likely to be present in small quantities in the commercial fuel oil supplied to the user or withdrawn from the local storage tank. In practice it is almost impossible to eliminate all of these impurities without employing an individual filter in the equipment for each fuel consuming device.

Many forms of filters are employed for this purpose. In general they are arranged so that the impurities to be filtered out tend to accumulate on the filter cartridge, dish, screen or other device employed in the construction. This accumulation of water, solid residues, immiscible liquids of indefinite composition, etc., tends to clog the filter medium itself and impair its operation, bringing about burner failure and service calls for cleaning and replacement.

The present invention contemplates the filtering of such liquids in a novel manner and in a novel apparatus according to which the dominant portion of the overall filtering operation is accomplished by making use of the barrier interface which is brought about by the stratification of two immiscible liquids, the upper one of which is the liquid desired in the pure state and the lower being the water and immiscible liquid which is to be rejected or held back. This interface condition may be brought about either by initial introduction of the heavier material to form a pool in the filtering apparatus, or by the gradual accumulation of such heavier constituents from the impure material coming from the storage tank.

It must be seen that unlike more conventional filters in which the filtration is carried out by static structures of a more or less rigid nature, there is employed a pool of heavier liquid which, together with the lighter medium, forms an interface due to stratification. This interface has surface tension differential which forms a barrier and entraps solid constituents and heavier liquid constituents. This interface forms a barrier impenetrable by the water, heavier immiscible liquids and solids, so that above this barrier very clear, clean liquid accumulates. Where the flow rate is relatively low, for example in the order of under 2 gallons per hour, the firing rate of rather large domestic oil burners, and the depth of the apparatus may be increased to any desired amount. At a three foot depth it has been found that all the foreign matter in the fuel oil can be separated by such barrier and the settling of minute particles which escape through the barrier. In consequence then it is thus possible to effect complete filtration of such fuel oils without any filter cartridge or filter medium other than the self or artificially produced barrier set up in the surface tension in the interface.

While it is possible to effect complete filtration by such a deep filtering apparatus by relying solely upon the barrier of the interface between the liquids, such apparatus is not ordinarily suitable for use in connection with usual oil burner installations. Where it is desired to reduce the height of the filtering apparatus and bring it to a size which is convenient for installation purposes, it is preferable to employ a filtering apparatus in which the interface barrier filtering procedure is relied upon for the dominant portion of the filtering process and to utilize a filter cartridge for separating out the minute particles which escape through the barrier and in the more shallow apparatus cannot completely settle.

Accordingly the invention contemplates the employment, in addition to a liquid receptacle open at the top and having a bottom admission opening and an overflow at a high elevation, of suitable arrangements whereby the liquid before it overflows is conducted through a filter cartridge immersed in the liquid for a substantial depth preferably insufficient to reach the pool of heavier liquid and out of such intimate contact with the tubular element as to not interfere with flow of filtrate along the tubular element to the overflow opening. Such an arrangement provides a substantial extended area of filtering medium which is subjected only to relatively clean oil in the upper strata. The velocity of the liquid is slow and cartridge need only separate out the mechanically entrapped small particles which though already wetted by the oil do not settle out of the upper strata.

Where such filters are intended for use in gravity-fed oil burning installations, or in installations where the fuel is supplied by a pump, the liquid in the filter is usually at a pressure above atmospheric. Such filters are then provided with a suitable type of cover which seals the top of the liquid receptacle and traps more or less air above the surface of the liquid and forms an air cushion. Where pumping is employed the air dome cushions the pressures and reduces pump noise.

In gravity-fed oil burner installations the filter is often employed between the discharge outlet of storage tank and the inlet of a constant level valve which controls the level of the oil supplied to the burner and usually incorporates a flow control valve. The supply line to the constant level valve is closed up to the needle. The valve chamber is open to the atmosphere and is necessarily at a level below the lowest level from which oil in a storage tank can be drained by gravity. In filters heretofore used with gravity-fed oil burners it was difficult, if not impossible, to utilize the oil near the bottom of the storage tank. Either the filter blocked off the flow of oil because of its elevation, or it interposed so much filter resistance as to stop the flow of oil to the controls.

According to the present invention, however, the filter which normally operates under the hydrostatic pressure above atmosphere of a partly filled tank can automatically change over to operation at negative pressure and act as a syphon so long as there is any liquid in the storage tank above its outlet opening and above the level maintained in the constant level valve.

This change in operation due to change in pressure is effected by the air in the dome above the liquid in the filter changing from a positive pressure condition to a partial vacuum. Thus the syphon action assists in overcoming line and filter resistance to maintain the improved flow to the constant level valve.

The preferable constructions utilized in the present invention employ a suitable liquid receptacle or storage chamber provided with connections for inlet and outlet piping. This receptacle carries a vertical, centrally disposed, tubular riser communicating with the discharge passageway and having an inlet opening at a high elevation, somewhat below the top of the receptacle. The receptacle is provided with a plate or cover and provisions are made so that extraneous air cannot enter into the tubular riser. The riser is surrounded by a suitable filter cartridge preferably made of controlled porosity felt.

Other and further objects of the invention will appear as the description proceeds.

The accompanying drawings show for purposes of illustrating the present invention several embodiments in which the invention may take form, it being understood that the drawings are illustrative of the invention rather than limiting the same.

In these drawings:

Figure 1 is a diagrammatic view illustrating the filter incorporated in a gravity fed oil burner supply system;

Figure 2 is a vertical sectional view showing one form of construction;

Figure 3 is a vertical sectional view similar to Figure 2 showing a modified form of construction; and Figures 4 to 6 are vertical sectional views of still further modified forms of construction.

In Figure 1 the vaporizer part of a conventional gravity fed burner is indicated at 10. Various forms of gravity fed burners may be employed. Such burners are usually connected with piping indicated at 11 with the metering valve 12 of a constant level valve designated generally at 13. This valve has a reservoir or body open to the atmosphere, a liquid responsive mechanism, such as a float indicated at 14, and an inlet valve indicated at 15. Many forms of such so-called constant level valves are in use to supply fuel at metered rates to consuming burners. The passages through which the fuel flows in these valves are very small so that the avoidance of particles likely to interfere with oil flow or with the setting of the valves is very important, and it is also important to avoid the entrance of any sticky or gummy constituents which might interfere with valve movement.

As shown in Figure 1 the inlet needle 15 of the control valve 13 is supplied with oil by gravity, or under a pressure, at least greater than that necessary to maintain the oil level indicated by the dotted line 16. This level determines the maximum level of a fuel pool in the burner, and is the lowest level from which oil can be supplied by gravity only to the control valve.

The storage tank is indicated generally at 17 and its bottom is a slight distance above the level of the dotted line extension 16 of the constant level in this valve, as indicated. The connections between the bottom of the storage tank and the inlet needle 15 of the control valve include piping 18 and 19 and a filter indicated at 20. The piping layout may of course vary substantially and include a cutoff and drain valve 18'. The filter position may be a convenient one, preferably somewhat above the level maintained by the constant level valve.

The filter 20 is shown more in detail in Figure 2. The filter has a receptacle-forming body member 21 of suitable size and depth and connected into the piping 18 and 19 as indicated. The piping 18 connects to an admission opening 22 in the bottom of the chamber or receptacle while the piping 19 connects with an outflow passage 23. In the form indicated in Figure 2 the central portion of the casing forming the receptacle has a relatively short boss 24 internally threaded as indicated at 25. A tubular riser or stem 26 is threaded at the lower end as indicated at 27 so as to fit in the threads 25. This riser or stem has a drilling 28 which opens downwardly but does not extend through the upper end 29 of the stem. The stem also has a cross drilling indicated at 30 spaced a short distance below the upper edge 31 of the receptacle or body 21. The riser or stem 26 is surrounded by a perforated sleeve 32 slightly larger in diameter to provide space for the flow of fuel between the sleeve and the riser. About this sleeve is a filter cartridge indicated at 33 and this cartridge as here shown extends from the top of the boss 24 to a distance somewhat higher than the cross bore 30.

A cover member 35 is fitted on top of the receptacle 21, a gasket 36 provides a tight joint. The cover bears against the cartridge 33 to hold it down against the boss. As here shown the upper end of the stem or riser 29, provides a head which bears against a gasket 37 resting on top of the cover. The stem may therefore be used to secure the sleeve, filter cartridge and the cover in place. A filter unit such as illustrated in Figure 2 may be installed in the piping for the burner and servicing can be accomplished merely by removing the cover, the stem sleeve and filter cartridge.

When fuel is supplied to the filter unit illustrated it enters through the admission opening 22 and must fill the chamber up to the cross bore 30 before it can overflow. It thus traps air between the surface S of the liquid and the lower face of the cover. This air has no means of escape and hence forms an air dome or cushion. To get to the overflow passage the liquid must not only rise to the desired level but must pass through the filter cartridge. The flow through such a filter is relatively slow so that the vertical velocity of the liquid in the relatively large chamber is very slow. All water, heavy solid particles, immiscible petroleum constituents, therefore, tend to accumulate in the bottom of the receptacle. Such an accumulation is indicated between stippling 40. Owing to the interfacial tension between the strata of clear, clean oil above, and the water, dirt and rejected material below, an interface designated at F is formed where the two layers meet. The level of this interface shifts as the heavier constituents accumulate or are drained away. This interface where the two strata do not mix forms a tough strong barrier which is impenetrable by the heavier liquid constituents and mechanically carried foreign particles, so that they tend to accumulate in this barrier and form a heavy scum which can readily be observed where a transparent receptacle is employed. If the stratification is broken up by stirring the heavy constituents settle out and the solids and constituents immiscible in either stratum diffuse toward the interface.

Clean, clear, oil of lower gravity, however, has no difficulty in rising through this pool of rejected matter passing through the barrier and being accepted by the upper strata of clear liquid as above indicated. Some minute particles of foreign material may pass through the barrier. These will fall out completely if the receptacle is sufficiently deep. In practice, however, such a deep receptacle cannot be employed and the filter cartridge is availed of to intercept such foreign solids in constructions such as illustrated. Controlled porosity felt is the preferred material used in the filter cartridge. It has known value as a filtering material without the inherent faults of other materials which lack control of porosity or are likely to discharge loose filtering medium which migrate into the clean fuel. The clear liquid passes through the filter cartridge and the perforated sleeve and moves along the riser.

When the liquid level in the storage tank is above the inlet opening 30 in the riser the hydrostatic pressure in the chamber will compress the air in the dome to compensate for this pressure. Inasmuch as the consuming device from the filter such as the control valve is a mechanism which is normally closed there will be an accumulation of liquid in the discharge passage 23 from the filter and in the tubular passage 28 of the riser so that under such normal pressure operations liquid is continuous from the interior of the chamber through the discharge passages all the way to the constant level valve. Owing to the intermittent operation of the burner at high fire, the flow in the reservoir is intermittent and for long periods the oil in it is completely quiet.

When the level in the storage chamber drops below the level of the riser inlet passage 30 the continuous liquid column from the storage tank to the control valve is maintained. There is no break caused by air bubbles or the like and liquid flow is continued, as in a syphon. It is thus possible in such a closed filter to drain the tank until air can enter the piping 18. This of course will break the suction.

The modified form of construction illustrated in Figure 3 contemplates a deeper receptacle 50 of the same general contour as that of Figure 2. The stem 51 is of course longer and inasmuch as there is greater settling of solid particles back into the barrier layer, the filter cartridge 52 may be made much shorter. It is here shown as being held away from the riser or stem 51 by coiled spring 53. Such a device operates the same as the one above described.

In the modification illustrated in Figure 4 the filter body 60 is provided with a riser 61 with a drilled hole 62. The filter cartridge 63 is supported between a shoulder 64 on the riser at 61 and the bottom of the cover member 65. Here the cover is held on by clips such as indicated at 66. In such a filter the air dome is formed in the same manner as in the other constructions and the interfacial barrier F is brought about between the stratified liquids in the same manner and it functions to control passage of clear oil and hold back immiscible liquids and heavier solids in the same manner as above set forth.

In the construction of Figure 5, a fragment of a constant level valve casing is shown at 70. The admission opening is at 71, the discharge opening to the inlet valve of the constant level valve at 72, a settling chamber at 73 formed by partition wall 74 and the eduction tube is at 75. The chamber is closed by a cover 76 and gasket 77 and a filter body such as a screen 78 is about the tube 74.

In Figure 6, the upper end of the eduction tube 75 is shown as carrying a porous plug 79.

Since it is obvious that the invention may be embodied in other forms and constructions within the scope of the claim, I wish it to be understood that the particular forms shown are but a few of these forms, and various modifications and changes being possible, I do not otherwise limit myself in any way with respect thereto.

What is claimed is:

A filter for liquids having a chamber-forming body having a bottom wall provided with an upwardly facing inlet opening at the lowest point of said chamber whereby liquid admitted must rise from the lowermost portion of this chamber, the body also having a discharge opening, an outlet tube connected to the discharge opening and having an inlet communicating with the interior of the body at an elevation above the admission port and below the top of the chamber, a liquid heavier than the liquid to be filtered located at the bottom of said chamber at said inlet opening, said heavier liquid establishing an interface between said liquids, whereby incoming liquid will be filtered at said interface and the insoluble components will settle around said inlet opening to provide additional filtering action.

References Cited in the file of this patent

UNITED STATES PATENTS

| | | |
|---|---|---|
| 1,372,828 | Renn | Mar. 29, 1921 |
| 1,373,720 | Gish | Apr. 5, 1921 |
| 1,432,687 | Grimord | Oct. 17, 1922 |
| 1,754,667 | Cabrera | Apr. 15, 1930 |
| 1,849,653 | Baylis | Mar. 15, 1932 |
| 1,856,141 | Stark | May 3, 1932 |
| 1,935,642 | Laughlin | Nov. 21, 1933 |
| 2,007,336 | Malivert | July 9, 1935 |
| 2,009,510 | Mobley | July 30, 1935 |
| 2,151,538 | Swanson | Mar. 21, 1939 |
| 2,165,826 | Werder | July 11, 1939 |
| 2,338,986 | Waterman | Jan. 11, 1944 |
| 2,429,321 | La Brecque | Oct. 21, 1947 |

FOREIGN PATENTS

| | | |
|---|---|---|
| 199,036 | Great Britain | Feb. 7, 1924 |